(12) United States Patent  
Lee

(10) Patent No.: US 11,052,451 B2  
(45) Date of Patent: Jul. 6, 2021

(54) GEAR MANUFACTURING METHOD AND GEAR MANUFACTURED THEREBY

(71) Applicant: Kwang Hui Lee, Busan (KR)

(72) Inventor: Kwang Hui Lee, Busan (KR)

( * ) Notice: Subject to any disclaimer, the term of this patent is extended or adjusted under 35 U.S.C. 154(b) by 247 days.

(21) Appl. No.: 16/065,114

(22) PCT Filed: Dec. 28, 2016

(86) PCT No.: PCT/KR2016/015367  
§ 371 (c)(1),  
(2) Date: Jun. 21, 2018

(87) PCT Pub. No.: WO2017/116127  
PCT Pub. Date: Jul. 6, 2017

(65) Prior Publication Data  
US 2019/0001397 A1    Jan. 3, 2019

(30) Foreign Application Priority Data

Dec. 31, 2015  (KR) .......................... 10-2015-0191174  
Dec. 26, 2016  (KR) .......................... 10-2016-0179078

(51) Int. Cl.  
*B21H 5/00*      (2006.01)  
*B21H 5/02*      (2006.01)  
(Continued)

(52) U.S. Cl.  
CPC .............. *B21H 5/027* (2013.01); *B21H 5/022* (2013.01); *B23F 1/06* (2013.01); *B23F 19/05* (2013.01);  
(Continued)

(58) Field of Classification Search  
CPC .......... B21H 5/022; B21H 5/027; B21H 5/02; B23F 1/06; B23F 1/065; B23F 9/02; B23F 9/08; B23P 15/14  
See application file for complete search history.

(56) References Cited

U.S. PATENT DOCUMENTS 4,855,556 A    8/1989  Mucha et al.  
6,007,762 A   12/1999  Amateau et al.  
(Continued)

FOREIGN PATENT DOCUMENTS

CN    102658319 A  *  9/2012  
FR       2175075 A1    10/1973  
(Continued)

OTHER PUBLICATIONS

International Search Report for PCT/KR2016/015367 dated Jul. 4, 2017 from Korean Intellectual Property Office.  
(Continued)

*Primary Examiner* — Debra M Sullivan  
(74) *Attorney, Agent, or Firm* — Revolution IP, PLLC

(57) ABSTRACT

A gear manufacturing method includes a step of preparing a gear blank; a step (teeth cutting step) of cutting the gear blank to form a half-finished gear having a plurality of gear teeth; a step (heat treatment step) of heat-treating the half-finished gear having the gear teeth; and a step (form rolling step) of rolling the half-finished gear which is subjected to the heat treatment, in which the gear teeth of the half-finished gear which is subjected to the teeth cutting step is formed with protuberances on both sides in a circumferential direction, and at the form rolling step, the protuberances are pressed by a rolling die, so that the half-finished gear becomes a gear.

5 Claims, 4 Drawing Sheets

(51) Int. Cl.
 B23P 15/14 (2006.01)
 C21D 1/06 (2006.01)
 B23P 9/02 (2006.01)
 C21D 8/00 (2006.01)
 B23F 1/06 (2006.01)
 B23F 19/05 (2006.01)
 C21D 9/32 (2006.01)

(52) U.S. Cl.
 CPC ............... *B23P 9/02* (2013.01); *B23P 15/14* (2013.01); *C21D 1/06* (2013.01); *C21D 8/005* (2013.01); *C21D 9/32* (2013.01); *C21D 2261/00* (2013.01)

(56) References Cited

U.S. PATENT DOCUMENTS

| | | | | |
|---|---|---|---|---|
| 2004/0219051 | A1* | 11/2004 | Sonti | B21H 5/022 419/31 |
| 2008/0134507 | A1 | 6/2008 | Kotthoff | |
| 2008/0201951 | A1* | 8/2008 | Kotthoff | B21H 5/022 29/893.37 |
| 2008/0209730 | A1* | 9/2008 | Kotthoff | B21H 5/022 29/893.3 |

FOREIGN PATENT DOCUMENTS

| | | |
|---|---|---|
| GB | 365352 A | 1/1932 |
| JP | 02679741 B2 | 11/1997 |
| JP | 2002-046030 A | 2/2002 |
| JP | 2012-096251 A | 5/2012 |
| KR | 10-1996-0033624 A | 10/1996 |
| KR | 10-2011-0116536 A | 10/2011 |
| RU | 2503524 C1 | 1/2014 |
| SU | 831439 A1 | 5/1981 |
| SU | 1696073 A1 | 12/1991 |

OTHER PUBLICATIONS

English translation of an Office Action of Russian Patent Application No. 2018123019.

* cited by examiner

Prior Art

Prior Art

[FIG. 5]
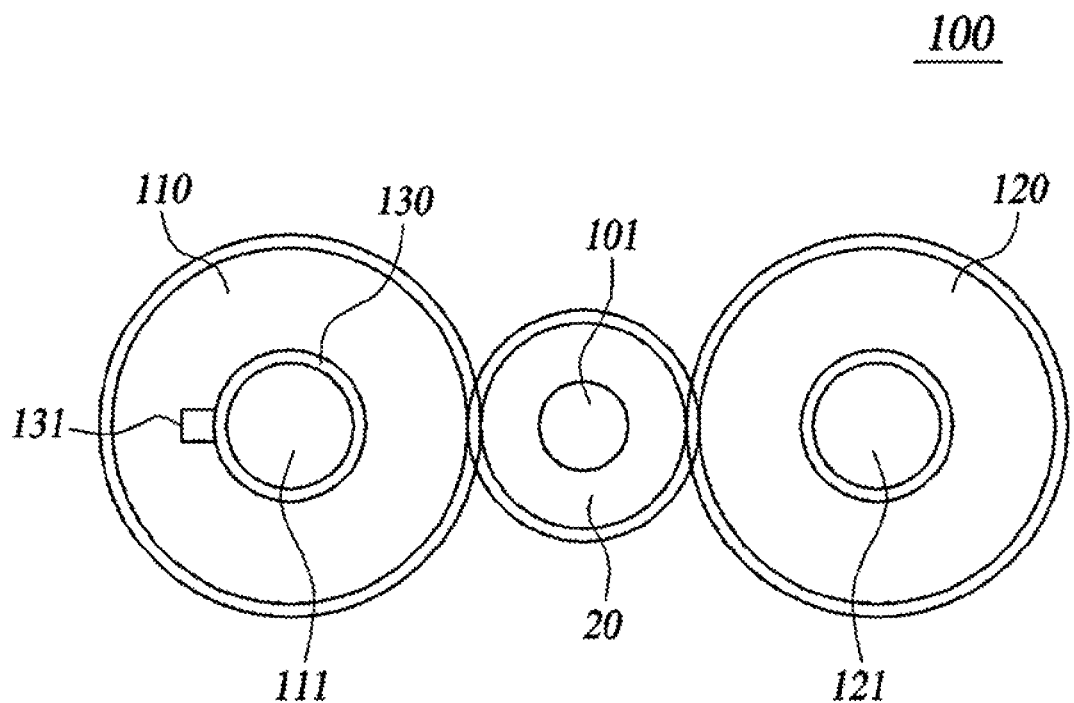

GEAR MANUFACTURING METHOD AND GEAR MANUFACTURED THEREBY

TECHNICAL FIELD

The present invention relates to a gear manufacturing method and a gear manufactured by the same, and more particularly, to a gear manufacturing method that can manufacture a gear of high accuracy and quality through a simple manufacturing process, and can reduce manufacturing costs and times, and the gear manufactured by the same.

BACKGROUND ART

In general, gears are manufactured by various methods, such as cutting, electric discharge machining, forming and the like. The cutting includes hob cutting, pinion cutting and rack cutting, and a CNC hobbing machine is generally used in the cutting process. After a gear blank is mounted to a table of the CNC hobbing machine, the gear blank and a hob are rotated continuously until all teeth are cut.

In case of machining a gear used for, for example, a gearbox of a vehicle, a shaving process of finishing a tooth shape to improve surface roughness and modify the tooth shape (crowning) is performed after a gear teeth generating process, such as shaping, hobbing and broaching, for the purpose of noise reduction.

The shaving is a finishing process of removing only small amounts of material from a surface of the gear tooth. It is possible to inexpensively manufacture a gear of high accuracy by the shaving, similar to a gear manufactured by grinding. In order to compensate deformation occurring at heat treatment, the deformation is simulated, and the tooth shape is modified by the shaving. The shaving is typically performed in a state in which a metal is soft, prior to heat treatment.

Since the high accuracy is required for a gear used for a high-class vehicle or a machine tool requiring for silence or accuracy, a gear of high accuracy is manufactured through a grinding process after heat treatment.

Since the grinding process is not a process of removing much amounts of material from the metal surface to modify the tooth shape, the grinding process cannot replace the shaving process for the gear which is subjected to the heat treatment. Accordingly, it is not useful to perform the grinding process on a gear having hardness of less than HRC 40, for example. The grinding process maintains the tooth shape, which is deformed during the heat treatment, by an accuracy level similar to that of the gear subjected to the shaving process prior to the heat treatment, or further increases the accuracy level.

FIG. 1 schematically shows a portion of a gear, in which a gear 10 has a plurality of teeth 11 along a circumferential direction thereof. In FIG. 1, reference numeral 13 indicates a pitch circle, 15 indicates an addendum circle, 17 indicates a dedendum circle, θ indicates a pressure angle, and 19 indicates a root circle of an involute tooth shape. A standard pressure angle θ of the gear is 14°, 20°, and 25°. The detailed description thereof will be omitted herein for clarity.

FIG. 2 shows a process of manufacturing a gear through a cutting process according to the related art. At a step ST-10, a material is subjected to a cold or hot forging process and a heat treatment (annealing or normalizing) process to prepare a blank gear having hardness and structure suitable for the cutting process. At a step ST-20, the blank gear is subjected to a turning process to have a wanted outer diameter and inner diameter.

At a step ST-30, the gear is cut to have a tooth shape (gear generating process) through a bobbing or shaping process, and then is finished through a shaving process. At a step ST-40, the gear teeth are inspected. After the step ST-30, the shaved gear is heat treated (step ST-50). The heat-treated gear is subjected to the grinding process (ST-60) to maintain the gear teeth, deformed during the heat treatment, by an accuracy level of the gear subjected to the shaving process prior to the heat treatment, or further increase the accuracy level above the shaved level, and then the gear is inspected and shipped (step ST-70).

During the heat treatment process, the gear will be subjected in order to a carburizing process and a tempering process, depending upon a material or application, so that surface hardness is high and core hardness is lower than the surface hardness. Alternatively, the gear is subjected to an induction hardening process to increase the surface hardness and lower the core hardness relative to the surface hardness.

In general, the heat treating process is performed so that the surface hardness is in the range of HRC 55 to 63, and a hardening depth is in the range of 0.8 to 1.4 mm.

In the case of manufacturing the gear through the gear shaping process (step ST-30) and the heat treatment process (step ST-50), there is a drawback in that the gear teeth are deformed due to the heat treatment, and thus the accuracy is deteriorated. Also, the grinding process has a problem in that since it is performed during the heat treatment, it is possible to generate the gear of high accuracy, but the production is expensive due to lower productivity, and thus mass production is difficult; and since small quantities of metal are removed from the tooth surface, the gear should be disused in case where the gear is largely deformed due to the heat treatment.

The induction hardening process should be performed on the heat-treated gear to increase the surface hardness and lower the core hardness, but since the gear has teeth protruding from an outer diameter or an inner diameter, it is not easily to perform the induction hardening process in which the hardness is varied depending upon the surface of the gear teeth.

Also, in case of form rolling, it is very difficult to fabricate a gear having a standard pressure angle θ, and a gear having a pressure angle of 45° is fabricated.

DISCLOSURE

Technical Problem

Accordingly, the present invention has been made in view of the above problems occurring in the prior art, and it is an object of the present invention to provide a gear manufacturing method that can reduce deformation caused by heat treatment, since a temperature of heat treatment is lowered; manufacture a gear having low core hardness and high surface hardness, without using an induction hardening equipment; reduce costs and time required for manufacturing the gear; and manufacture the gears on a mass production basis, and the gear manufactured by the same.

Technical Solution

To accomplish the above object, there is provided a gear manufacturing method including: a step of preparing a gear blank; a step (teeth cutting step) of cutting the gear blank to form a half-finished gear having a plurality of gear teeth; a step (heat treatment step) of heat-treating the half-finished gear having the gear teeth; and a step (form rolling step) of rolling the half-finished gear which is subjected to the heat treatment, in which the gear teeth of the half-finished gear which is subjected to the teeth cutting step is formed with protuberances on both sides in a circumferential direction, and at the form rolling step, the protuberances are pressed by a rolling die, so that the half-finished gear becomes a gear.

The protuberance has the maximum thickness at a portion corresponding to a pitch circle, and the thickness is gradually decreased toward an addendum circle and a dedendum circle.

The gear is an involute gear, the protuberance is provided in a range of an addendum circle and a dedendum circle, and the protuberance has the maximum thickness at a portion corresponding to a pitch circle.

The protuberance has the maximum thickness at a portion corresponding to a pitch circle, and the thickness of the protuberance is set in a range of 100 to 200 μm.

The gear is pressed at the form rolling step so that surface hardness of the gear tooth is higher than core hardness.

At the heat treatment step, the gear is heat treated so that surface hardness of the protuberance of the half-finished gear made after the heat treatment is in a range of 70 to 85% to that of a finished gear.

At the form rolling step, ultrasonic vibration is applied to the rolling die.

In addition, there is provided a gear manufactured by the gear manufacturing method, in which the gear has a hardness gradient, of which the surface hardness is high and the core hardness is low.

Advantageous Effects

With the gear manufacturing method according to the present invention and the gear manufactured by the method, since the heat treatment temperature is lowered, the surface deformation caused by the heat treatment is decreased. The heat treatment, such as a carburizing process or an induction hardening process, is not necessary in the heat treatment process. It is possible to manufacture the gear having the gradient, in which the surface hardness is high, while the core hardness is low, even by the total hardening process. Also, the gear having improved gear accuracy can be manufactured. In addition, times and costs required for manufacturing the gear can be reduced by about 30%, as compared with the method of manufacturing the gear by use of a cutting and heat treating method.

DESCRIPTION OF DRAWINGS

FIG. 5 is a view schematically illustrating a form rolling process in the gear manufacturing method according to the embodiment of the present invention.

MODE FOR INVENTION

Hereinafter, a gear manufacturing method according to one embodiment and a gear manufactured by the same will be described in detail with reference to the attached drawings, in which the explanation on parts overlapped with the related arts will be omitted for clarity.

Figure 1:
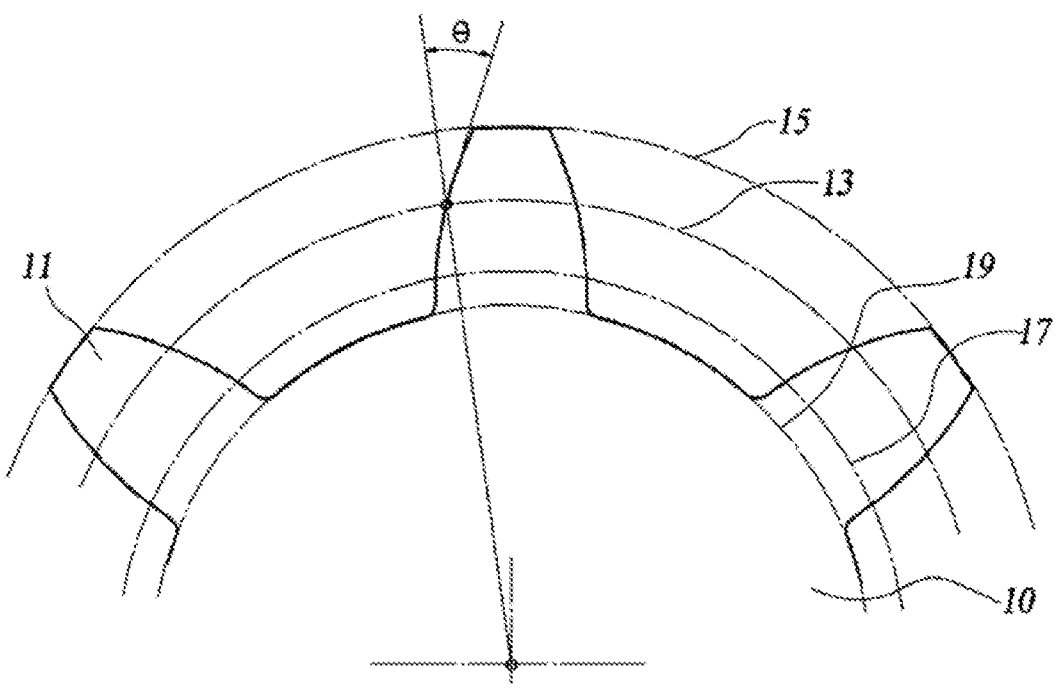
FIG. 1 is a front view illustrating a portion of a general gear.
Figure 2:
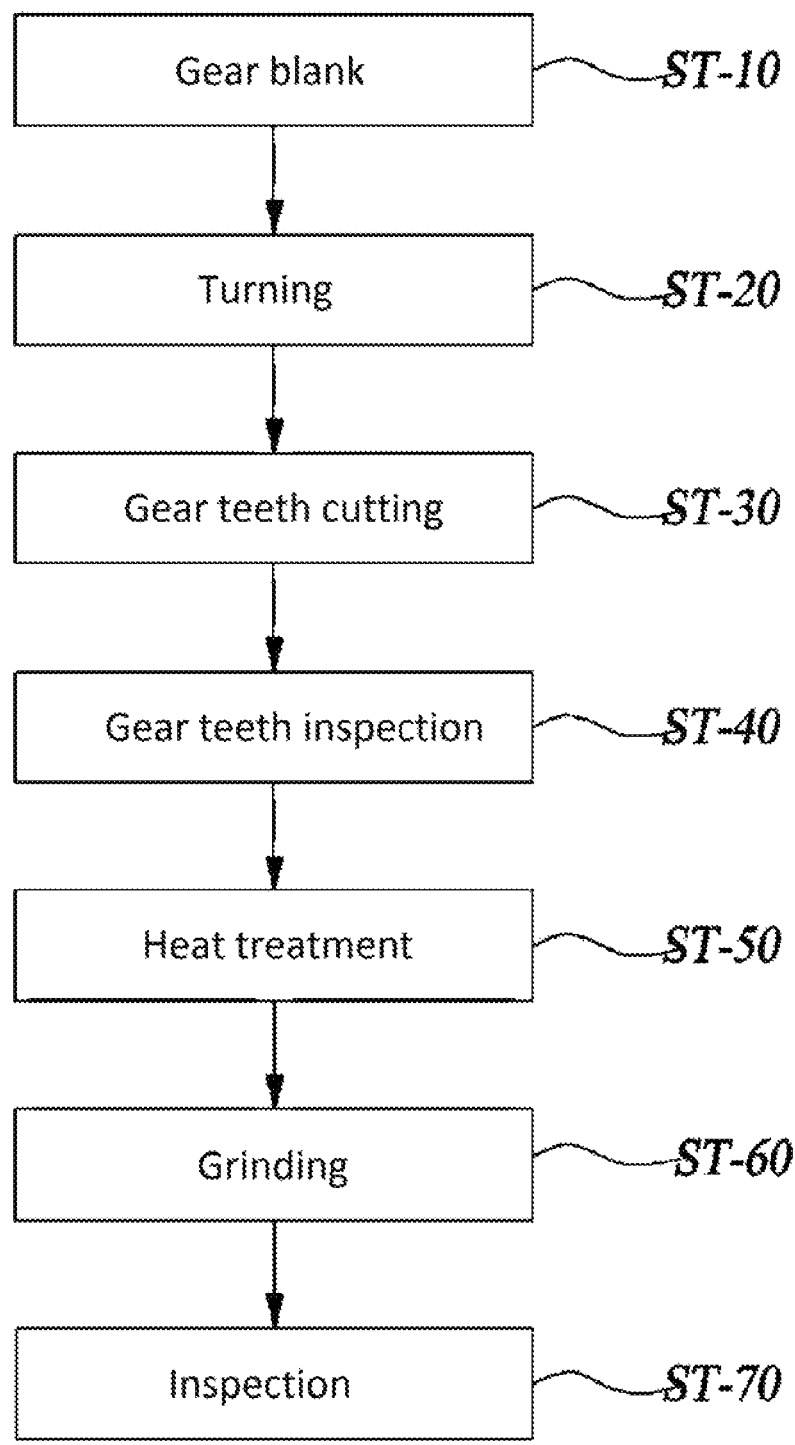
FIG. 2 is a flowchart illustrating a method of manufacturing a gear through a teeth cutting process according to the related art.
Figure 3:
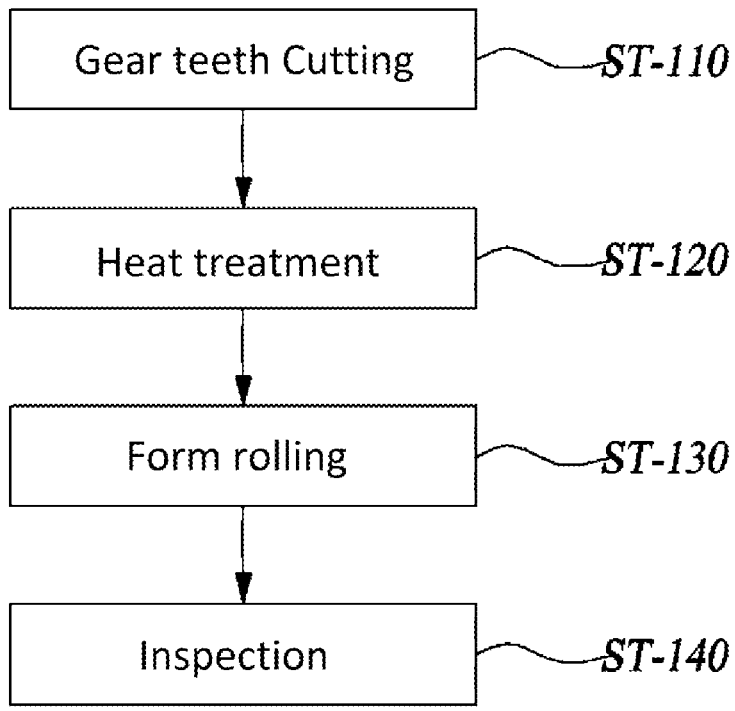
FIG. 3 is a flowchart illustrating a gear manufacturing method according to one embodiment of the present invention.
Figure 4:
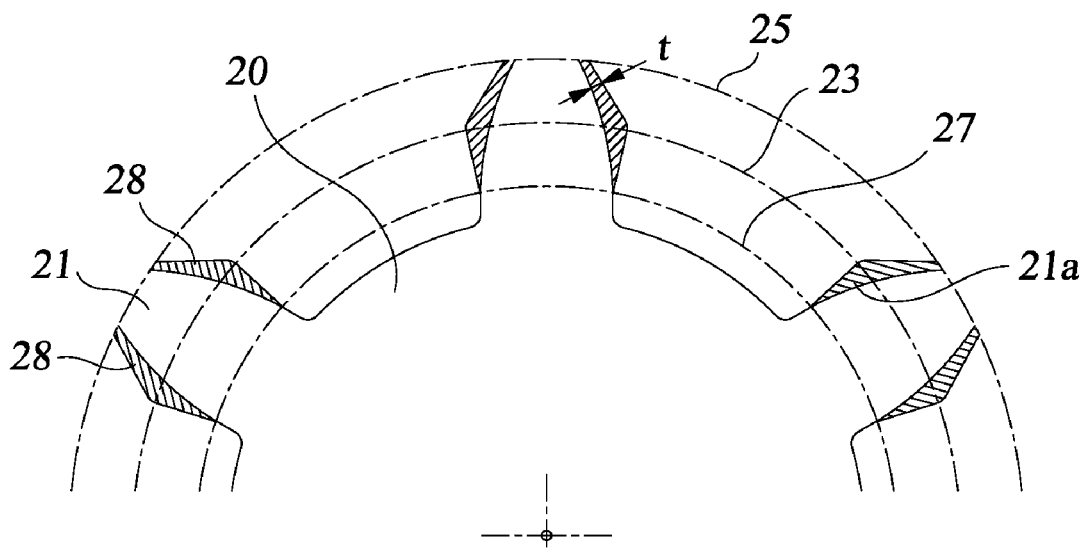
FIG. 4 is a front view illustrating a portion of a half-finished gear which is made by the gear manufacturing method according to the embodiment of the present invention.

FIG. 3 is a flowchart illustrating a gear manufacturing method according to one embodiment of the present invention. FIG. 4 is a front view illustrating a portion of a half-finished gear which is made by the gear manufacturing method according to the embodiment of the present invention. FIG. 5 is a view schematically illustrating a form rolling process in the gear manufacturing method according to the embodiment of the present invention.

The gear manufacturing method according to this embodiment includes a step of preparing a gear blank, a step ST-110 of cutting gear teeth on the gear blank to manufacture a half-finished gear 20 having a plurality of gear teeth 21, a step ST-120 of heat-treating the half-finished gear having the gear teeth, and a step of form rolling the half-finished gear which is subjected to the heat treatment.

The gear tooth 21 of the half-finished gear 20 which is subjected to the teeth cutting is formed with protuberances 28 on both sides in a circumferential direction, and at the form rolling step ST-130, the protuberances 28 are pressed by rolling dies, so that the half-finished gear 20 becomes a gear. The technique of the rolling dies at the form rolling step ST-130 has been known in the art, and thus its detailed description will be omitted herein.

The step of preparing the material is a step of preparing a material for the gear to be manufactured which corresponds to the material preparing step according to the related art. At the material preparing step, prepared is a material having hardness and structure suitable for the cutting process. The material made by hot or cold forging is subjected to a heat treatment process, such as annealing or normalizing, to prepare a blank gear having low hardness and uniform structure suitable for the cutting process. The heat treatment process has been known in the art, and thus its detailed description will be omitted herein.

At the teeth cutting step ST-110, the gear blank prepared at the material preparing step is cut to have gear teeth on an outer circumference or an inner circumference thereof. The process of cutting the gear teeth generates the gear teeth by bobbing or shaving according to the related art, and the half-finished gear 20 is manufactured by the shaving.

It should be noted that the half-finished gear 20 is an intermediate product of a finished gear which is subjected to the step ST-110 of cutting the gear teeth to provide the gear with the plurality of gear teeth 21, and then is subjected to the heat treatment step ST-120 and the form rolling step ST-130. Hereinafter, the intermediate product made after the heat treatment step ST-120 will be described as the half-finished gear.

The half-finished gear 20 subjected to the step ST-110 of cutting the gear teeth has the plurality of gear teeth 21, and the gear tooth 21 has the protuberance 28 on both sides which are outer surfaces 21a of the finished gear, in the circumferential direction. The outer surface 21a becomes an imaginary outer surface of the finished gear.

The protuberance 28 is the maximum thickness at a portion corresponding to the pitch circle 23, and a thickness t of the protuberance 28 at the portion corresponding to the pitch circle is in the range of 100 to 200 μm. The protuberance 28 is preferably formed so that the thickness t is gradually decreased towards an addendum circle 25 and a dedendum circle 27.

When the surface of the protuberance 28 is pressed by the rolling dies after the heat treatment step ST-120 so that the gear tooth 21 is shaped to have the size of the final outer surface 21a, the protuberance has the maximum thickness t at the portion corresponding to the pitch circle 23. Therefore, shape deformation reaches the highest at the portion corresponding to the pitch circle 23, while the shaping deformation is gradually decreased toward the addendum circle and the dedendum circle. Accordingly, after the form rolling, the portion corresponding to the pitch circle 23 has the maximum hardening depth and the highest surface hardness.

According to the method of manufacturing the gear according to this embodiment, it is possible to manufacture the gear so that the surface hardness is not uniform, in other words, the surface hardness of the gear tooth is varied in such a way that the portion corresponding to the pitch circle 23 has the highest surface hardness, but the surface hardness is gradually decreased away from the pitch circle 23. By adjusting the thickness of the protuberance 28, it is possible to make the surface hardness of the portion corresponding to the pitch circle higher than that of other portions, for example.

In the case where the target gear is an involute gear, the protuberance 28 is provided in a zone extending from the addendum circle to the dedendum circle. In this instance, the protuberance 28 preferably has the highest thickness t at the portion corresponding to the pitch circle.

At the heat treatment step ST-120, the gear is heat treated so that the surface hardness of the protuberance 28 of the half-finished gear 20 is in the range of 70 to 85% to the surface hardness of the finished gear. At the heat treatment step ST-120, the half-finished gear 20 is subjected to a carburizing process or an induction hardening to harden only the surface layer. In the case of the carburizing process, a material, such as SNCM 420 or SNCM 518H may be heat treated. Since the surface hardness of the general gear is HRC 55 to 63, the gear is heat treated at the heat treatment step according to the present invention so that the surface hardness is in the range of HRC 38 to 54. The surface hardness can be lowered by lowering the heating temperature at the carburizing process.

Meanwhile, in the method of manufacturing the gear according to this embodiment, a total hardening process can be performed at the heat treatment step ST-120. Since at the form rolling step ST-130 the surface structure is dense and the surface hardness is increased, even if the core of the gear is subjected to the total hardening process at the heat treatment step ST-120, it is possible to manufacture the gear having a hardness gradient, of which the surface hardness is high and the core hardness is low, after the form rolling step ST-130.

The thickness t of the protuberance 28 and the surface hardness of the gear formed after the heat treatment step may be set in inverse proportion to each other. For example, in the case where the surface hardness of the gear is HRC 60, if the thickness t of the protuberance is thick, the surface hardness obtained after the heat treatment step ST-120 may be lowered. If the surface hardness obtained after the heat treatment step ST-120 is set to be high, the thickness t of the protuberance 28 may be thin.

The protuberance 28 has the maximum thickness at the portion corresponding to the pitch circle 23, and the thickness t of the protuberance 23 at the pitch circle is in the range of 100 to 200 μm. In the case where the gear is heat treated at the heat treatment step ST-120 so that the surface hardness of the protuberance 28 of the half-finished gear made after the heat treatment step ST-120 is in the range of 70 to 80% to the surface hardness of the finished gear, the protuberance 28 is pressed at the form rolling step ST-130, the gear tooth 21 is shaped to have the size of the gear tooth of the finished gear, and the surface hardness is in the range of HRC 55 to 63.

As illustrated in FIG. 5, the half-finished gear 20 is pressed by rolling dies 110 and 120 having gear teeth, with the half-finished gear being interposed between the rotating rolling dies and being meshed with the rolling dies, so that the protuberance 28 is plastically deformed to form the finished gear. Reference numerals 111 and 121 in FIG. 5 indicate rotating shafts of the rolling dies 110 and 120. Reference numeral 101 indicates a rotating shaft which is engaged to the half-finished gear 20. Any one of the rotating shafts for the rolling dies 110 and 120 is rotated by the motor.

At the form rolling step ST-130 of the gear manufacturing method according to this embodiment, ultrasonic vibration is applied to at least one of the rolling dies 110 and 120. The form rolling step ST-130 of the gear manufacturing method is not a process of creating a smooth surface, but is a process of pressing the protuberance 28 to increase the surface hardness, as well as the smooth surface. Therefore, the half-finished gear is rolled at room temperature, but there are a lot of rolling amounts. If the ultrasonic vibration is applied to at least one of the rolling dies 110 and 120, the forming is easily carried out in the form rolling process. At the form rolling step ST-130 of this embodiment, the surface hardness is lower than that of the heat-treated gear, but the surface hardness of the half-finished gear 20 prior to the form rolling step ST-130 is in the range of HRC 38 to 54. Therefore, the ultrasonic vibration is preferably applied to the rolling die, thereby easily performing the form milling. As illustrated in FIG. 5, the rotating shaft 111 of the rolling die 110 is rotatably fitted into a ring 130, and a ultrasonic generator 131 is attached to the ring 130, thereby generating the ultrasonic vibration on the rolling die 110. The ultrasonic generator 131 may be installed to both ends of the rotating shaft 111 of one rolling die 110, and may be installed to the rotating shaft 121 of the other rolling die 120.

By manufacturing the gear through the above steps, since the gear is heat treated at low temperature, and the surface hardness is not remarkably increased after the heat treatment, the surface is hardly deformed by the heat treatment, and costs for the heat treatment is reduced. It is possible to adjust the gradient of the surface hardness of the finished gear, the surface structure is improved, and the finished gear has high surface roughness. Since the surface hardness is changed depending upon the thickness of the protuberance 28, the protuberance 28 is formed to have thickness varied along the surface of the gear tooth 21, thereby forming a wanted surface hardness.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

With the gear manufacturing method according to the present invention and the gear manufactured by the method, since the heat treatment temperature is lowered, the surface deformation caused by the heat treatment is decreased. The heat treatment, such as a carburizing process or an induction hardening process, is not necessary in the heat treatment process. It is possible to manufacture the gear having the gradient, in which the surface hardness is high, while the core hardness is low, even by the total hardening process. Also, the gear having improved gear accuracy can be manufactured.

In addition, times and costs required for manufacturing the gear can be reduced by about 30%, as compared with the method of manufacturing the gear by use of a cutting and heat treating method.

The invention claimed is:

1. A gear manufacturing method consisting of:
   a step of preparing a gear blank;
   a step of teeth cutting by cutting the gear blank to form a half-finished gear (20) having a plurality of gear teeth (21);
   a step of heat treatment by heat-treating the half-finished gear having the plurality of gear teeth; and
   a step of form rolling by rolling the half-finished gear after the heat treatment,
   wherein, in the teeth cutting step, protuberances (28) are formed on both sides of each of the plurality of gear teeth in a circumferential direction,
   wherein, in the form rolling step, the protuberances (28) are pressed by a rolling die so that the half-finished gear becomes a gear,
   wherein each of the protuberances (28) has a maximum thickness at a portion corresponding to a pitch circle, and the thickness is gradually decreased toward an addendum circle and a dedendum circle,
   wherein the maximum thickness of each protuberance at the pitch circle ranges from 100 to 200 µm.

2. The gear manufacturing method according to claim 1, wherein the gear is an involute gear, and each of the protuberances (28) is provided in a range of an addendum circle and a dedendum circle.

3. The gear manufacturing method according to claim 1, wherein the gear is pressed at the form rolling step so that surface hardness of the gear tooth (21) is higher than core hardness.

4. The gear manufacturing method according to claim 1, wherein, in the heat treatment step, the half-finished gear is heat treated so that surface hardness of each protuberance (28) of the half-finished gear after the heat treatment is in a range of 70 to 85% to that of a finished gear.

5. The gear manufacturing method according to claim 1, wherein at the form rolling step, ultrasonic vibration is applied to the rolling die.

\* \* \* \* \*